(12) United States Patent
Zhang et al.

(10) Patent No.: US 12,057,754 B2
(45) Date of Patent: Aug. 6, 2024

(54) MOTOR WITH FLAME-RESISTANT TERMINAL CONNECTING DEVICE AND LEAD PORTION

(71) Applicant: JIANGSU LEILI MOTOR CO., LTD., Changzhou (CN)

(72) Inventors: Qin Zhang, Changzhou (CN); Weichao Ding, Changzhou (CN); Fugang Wang, Changzhou (CN); Lixiang Wang, Changzhou (CN); Zhen Wang, Changzhou (CN)

(73) Assignee: JIANGSU LEILI MOTOR CO., LTD., Changzhou (CN)

( * ) Notice: Subject to any disclaimer, the term of this patent is extended or adjusted under 35 U.S.C. 154(b) by 390 days.

(21) Appl. No.: 17/036,744

(22) Filed: Sep. 29, 2020

(65) Prior Publication Data

US 2021/0099047 A1 Apr. 1, 2021

(30) Foreign Application Priority Data

Sep. 30, 2019 (CN) .......................... 201910939101.8
Sep. 30, 2019 (CN) .......................... 201910939686.3

(51) Int. Cl.
*H02K 5/22* (2006.01)
*A47L 15/42* (2006.01)
(Continued)

(52) U.S. Cl.
CPC .......... *H02K 5/225* (2013.01); *A47L 15/4221* (2013.01); *H01R 13/502* (2013.01);
(Continued)

(58) Field of Classification Search
CPC .......... H02H 5/00; H02H 5/048; H02H 5/225; H02H 5/047; H02H 5/22; H02H 5/136;
(Continued)

(56) References Cited

U.S. PATENT DOCUMENTS 3,167,293 A * 1/1965 Stenger .................... F25B 31/02
248/223.31
4,061,935 A * 12/1977 Kandpal ................. H02K 11/25
361/25
(Continued)

FOREIGN PATENT DOCUMENTS

CN  107795725 A  3/2018
CN  207437881 U  6/2018
(Continued)

*Primary Examiner* — Maged M Almawri
(74) *Attorney, Agent, or Firm* — Barnes & Thornburg LLP

(57) ABSTRACT

The present disclosure provides a motor, a water divider, and a dishwasher with the water divider. The motor includes: a housing, accommodating a coil assembly; a lead portion, electrically connected to the coil assembly and configured to be electrically connected to an external connector; a terminal connecting device, connected to the housing and configured to receive the lead portion and the external connector and electrically connect the lead portion to the external connector; and an isolation component, fixed to the terminal connecting device and enclosing a live part of the lead portion together with the terminal connecting device, and the terminal connecting device and the isolation component are both made from a flame-retardant material.

17 Claims, 16 Drawing Sheets

(51) Int. Cl.
*H01R 13/502* (2006.01)
*H01R 13/527* (2006.01)
*H02K 5/136* (2006.01)
*H01R 13/11* (2006.01)
*H01R 31/06* (2006.01)

(52) U.S. Cl.
CPC ........... *H01R 13/527* (2013.01); *H02K 5/136* (2013.01); *H01R 13/11* (2013.01); *H01R 31/06* (2013.01); *H01R 2201/10* (2013.01)

(58) Field of Classification Search
CPC ...... H02K 11/25; H02K 11/27; H02K 11/225; H02K 3/522; H01R 31/06; H01R 13/502
USPC .................................. 310/71, 68 C; 318/783
See application file for complete search history.

(56) References Cited

U.S. PATENT DOCUMENTS

| | | | | |
|---|---|---|---|---|
| 4,467,385 A * | 8/1984 | Bandoli | ............... | H01H 61/002 318/788 |
| 4,523,798 A * | 6/1985 | Barrows | ................ | H01R 31/06 439/752 |
| 4,571,517 A * | 2/1986 | Chastine | ................ | H02K 11/25 361/22 |
| 4,716,326 A * | 12/1987 | Fisher | ................... | H01H 35/10 310/68 E |
| 4,791,329 A * | 12/1988 | Ubukata | ................ | H02K 11/25 337/380 |
| 4,894,571 A * | 1/1990 | Hildebrandt | ........... | H02K 11/25 310/71 |
| 4,926,081 A * | 5/1990 | DiFlora | ................ | H01R 4/2462 310/71 |
| 5,129,843 A * | 7/1992 | Bowsky | ............... | H01R 13/521 439/181 |
| 5,515,217 A * | 5/1996 | Higashikata | ....... | H01H 37/5436 361/25 |
| 5,848,918 A * | 12/1998 | Warner | ............... | H01R 13/432 439/746 |
| 6,326,879 B1 * | 12/2001 | Hangmann | .......... | H01H 37/043 337/380 |
| 6,341,944 B1 * | 1/2002 | Butcher | .............. | F04D 15/0218 417/40 |
| 6,553,663 B2 * | 4/2003 | Bunch | ................... | F04B 39/121 29/857 |
| 6,665,196 B2 * | 12/2003 | Jang | ....................... | H02K 5/225 361/753 |
| 6,683,396 B2 * | 1/2004 | Ishida | ....................... | B25F 5/00 310/71 |
| 6,760,216 B2 * | 7/2004 | Seo | .......................... | H02B 1/06 361/679.01 |
| 6,917,129 B2 * | 7/2005 | Becker | ................... | H02K 11/38 310/71 |
| 7,038,570 B2 * | 5/2006 | McMichael | ............ | H02K 11/25 337/380 |
| 7,484,992 B2 * | 2/2009 | Boischio | ................ | H02K 5/225 310/71 |
| 7,531,926 B2 * | 5/2009 | Jones | ...................... | H02K 11/25 310/71 |
| 7,839,259 B2 * | 11/2010 | Takeda | ................... | F04B 39/121 337/380 |
| 8,076,813 B2 * | 12/2011 | Hussey | .................. | H02K 11/27 310/179 |
| 9,480,177 B2 * | 10/2016 | Trudeau, Jr. | ........... | H02K 11/25 |
| 9,546,663 B2 * | 1/2017 | Høj | ..................... | F04D 13/0693 |
| 2001/0048285 A1 * | 12/2001 | Furukawa | ............... | F04B 35/04 318/783 |
| 2002/0155741 A1 * | 10/2002 | Herrick | ................. | F04B 39/121 439/199 |
| 2003/0193768 A1 * | 10/2003 | Boischio | ................ | H02K 11/25 361/103 |
| 2005/0196285 A1 * | 9/2005 | Jayanth | .................... | F04C 28/28 417/410.5 |
| 2007/0194643 A1 * | 8/2007 | Jones | ..................... | H02K 11/25 310/68 R |
| 2008/0022597 A1 * | 1/2008 | Boischio | ................ | H02K 11/33 49/74.1 |
| 2008/0179974 A1 * | 7/2008 | Kimball | ................ | H01R 33/06 310/91 |
| 2011/0076162 A1 * | 3/2011 | Heidecker | .......... | H01R 13/5219 417/313 |
| 2012/0256505 A1 * | 10/2012 | Hanson | .................. | H02K 3/522 310/71 |
| 2012/0282124 A1 * | 11/2012 | Bingham | ................ | F04C 23/008 417/423.14 |
| 2014/0015357 A1 * | 1/2014 | Randolph | .............. | H01R 4/185 310/71 |
| 2015/0015103 A1 * | 1/2015 | Isoda | ...................... | F01P 7/026 310/71 |
| 2015/0076946 A1 * | 3/2015 | Schoele | ................. | H02K 5/148 310/71 |
| 2015/0123501 A1 * | 5/2015 | Jang | ......................... | H02K 5/08 310/43 |
| 2015/0137635 A1 * | 5/2015 | Firat | ..................... | H02K 3/522 310/71 |
| 2020/0106198 A1 * | 4/2020 | Seo | .......................... | H01R 9/24 |
| 2022/0247265 A1 * | 8/2022 | Seo | ....................... | H01R 13/405 |
| 2022/0311306 A1 * | 9/2022 | Kunii | ..................... | H01R 9/223 |

FOREIGN PATENT DOCUMENTS

| | | |
|---|---|---|
| CN | 209839225 U | 12/2019 |
| CN | 211093884 U | 7/2020 |

* cited by examiner

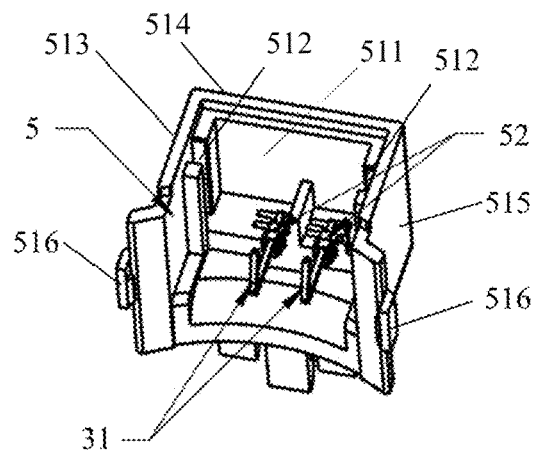
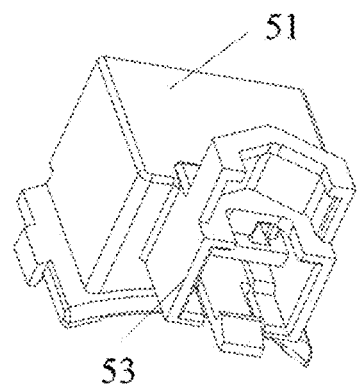
FIG. 3A
FIG. 3B
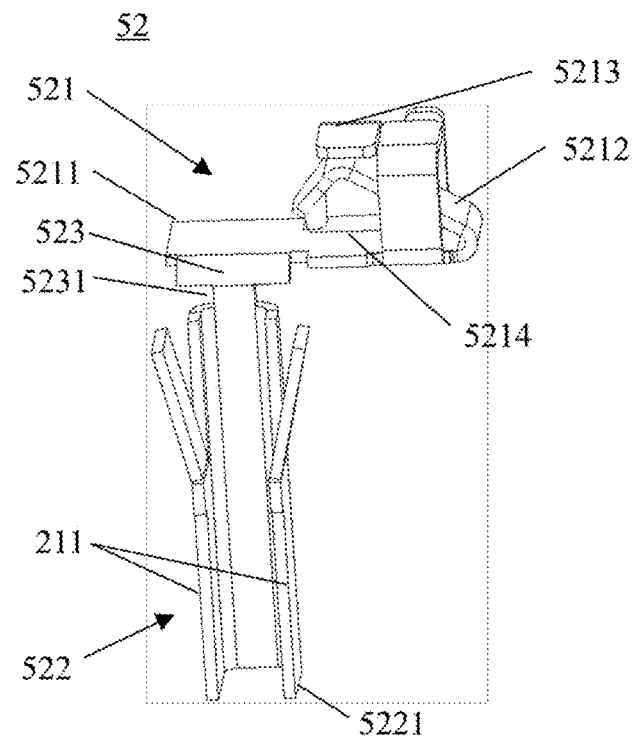
FIG. 3C

A-A

MOTOR WITH FLAME-RESISTANT TERMINAL CONNECTING DEVICE AND LEAD PORTION

CROSS REFERENCE TO RELATED APPLICATIONS

This application claims the benefits of the Chinese patent application NO. 201910939101.8 filed on Sep. 30, 2019 and the Chinese patent application NO. 201910939686.3 filed on Sep. 30, 2019, the entire contents of which are incorporated herein by reference in their entirety as part of the present application.

TECHNICAL FIELD

Embodiments of the present disclosure relate to a motor, a water divider and a dishwasher with the water divider.

BACKGROUND

Small motors are important basic products widely used in various fields such as factory automation, domesticity automation, and office automation. Typical small motors need to be connected to the external connector through lead to provide current to the stator windings of the motor. The lead portion forms the live part of the motor. In order to meet the safety regulations, the live part of the motor is usually surrounded by the motor mounting base or rear cover which must be made from a flame-resistant material, resulting in a high overall cost of the motor.

In addition, the motor and the external connector are usually transitionally connected through a printed circuit board (PCB). This kind of connection method will cause a series of problems: firstly, the poor electrical connection between the PCB and the motor will cause the motor circuit to open; secondly, at least one welding process is performed between the PCB and the motor winding and the external connector, as a result of which, problems such as pseudo soldering, pads peeling off, and solder beads splashing to gears may occur; finally, the labor cost of welding process is high.

Dishwasher is a kind of household appliance, which needs to cyclically switch between a plurality of water flow channels in operation. Water divider is usually connected to the water diversion valve of the dishwasher and is used to drive the cyclic switching of the direction of the water flow channel in the water diversion valve. In order to achieve a precise water diversion control, a motor is usually used to drive the water divider. Therefore, the above problems also exist in water dividers and dishwashers with the above motors.

SUMMARY

At least one embodiment of the present disclosure provides a motor including: a housing, accommodating a coil assembly; a lead portion electrically connected to the coil assembly and configured to be electrically connected to an external connector; a terminal connecting device connected to the housing and configured to receive the lead portion and the external connector and electrically connect the lead portion with the external connector; and an isolation component fixed to the terminal connecting device and enclosing a live part of the lead portion together with the terminal connecting device. The terminal connecting device and the isolation component are both made from a flame-retardant material.

At least one embodiment of the present disclosure provides a water divide, including: the above-mentioned motor; a driving shaft for switching a direction of water flow of a dishwasher, the driving shaft in transmission connection with the motor; and a water divider housing accommodating the driving shaft. The water divider housing is fixedly connected to the motor, the lead portion of the motor is isolated from the water divider housing by the isolation component and the terminal connecting device, the water divider housing is made from a non-flame-resistant material.

At least one embodiment of the present disclosure provides a dishwasher, including: a water diversion valve provided with a switching element and a plurality of water flow channels; and the above-mentioned water divider. The driving shaft of the water divider is connected to the water diversion valve to drive the switching element to switch a water flow direction between the plurality of the water flow channels.

BRIEF DESCRIPTION OF THE DRAWINGS

The accompanying drawings of the embodiments will be briefly introduced below to more clearly illustrate the technical solutions of the embodiments of the present invention. Obviously, the accompanying drawings in the following description only relate to some embodiments of the present invention, and thus are not limitative of the present invention.

FIG. 3A shows a perspective view of a terminal connecting device according to an exemplary embodiment of the present disclosure;

FIG. 3B shows another perspective view of the terminal connecting device shown in FIG. 3A;

FIG. 3C shows a perspective view of a terminal according to an exemplary embodiment of the present disclosure;

DETAILED DESCRIPTION

Figure 1:
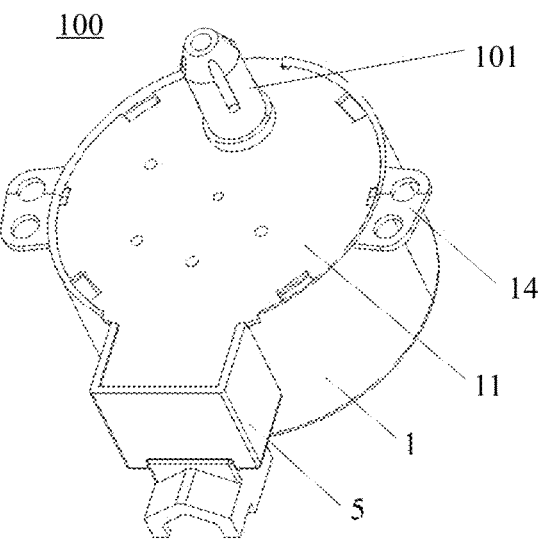
FIG. 1 shows a perspective view of a motor according to an exemplary embodiment of the present disclosure.

In order to make objects, technical details and advantages of the embodiments of the invention apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present invention belongs. The terms "first," "second," etc., which are used in the description and the claims of the present disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to indicate that the elements or the objects stated before these terms encompass the elements or the objects and equivalents thereof listed after these terms, but do not preclude other elements or objects. The phrases "connect", "connected", etc., are not intended to be limited to a physical connection or mechanical connection, but may include an electrical connection, directly or indirectly. The terms "on," "under," "right," "left" and the like are only used to indicate relative position relationship, and when the absolute position of the object which is described is changed, the relative position relationship may be changed accordingly.

It should be noted that the "flame-resistant material" referred to in the present disclosure refer to a material that are not easy to burn or can self-extinguish, especially flame-resistant material that meet the GB20286-2006 standard. Commonly used flame-resistant material can be engineering plastic material or rubber material. The flame-resistant material is usually prepared by adding flame retardant to a non-flame-resistant material to make the non-flame-resistant material possess flame retardant properties. The price of flame retardants is relatively high, so the price of flame-resistant material is higher than that of non-flame-resistant material. At the same time, the requirements for the production process of flame-resistant material have increased accordingly. In addition, metal material has flame-retardant properties and can also be used as a flame-resistant material. Typical metal materials include but are not limited to copper, aluminum, iron, copper alloys, aluminum alloys, iron alloys, and so on.

The "non-flame-resistant material" referred to in the present disclosure may include, for example, typical engineering plastics that have not been processed with flame retardants, such as polycarbonate (PC), polyamide (PA), polyoxymethylene (POM), polyphenylene oxide (PPO), polyester (PET, PBT), polyphenylene sulfide (PPS) and polyaryl ester or acrylonitrile-butadiene-styrene copolymer (ABS), etc., but the present disclosure is not limited thereto.

A typical motor includes a body, a coil frame, a pin installed on the coil frame, a motor control end, a mounting base, and a rear cover, etc. When assembling the motor, the motor control end is welded and assembled with the pins on the coil frame of the motor, and then the two and the body are installed between the rear cover and the mounting base, and the motor control end is connected to the electrical connector through the rear cover.

At this time, the live part of the motor is the pin and the motor control end, the upper and lower ends of which are adjacent to or in direct contact with the mounting base and the rear cover, respectively. In order to meet the safety requirements, the parts around the live part of the motor must be made from a flame-resistant material, so the pin and motor control end must be surrounded by the flame-resistant material. Therefore, both the rear cover and the mounting base must be made from the flame-resistant material, which leads to relatively high manufacturing costs of the motor.

In addition, the motor and the external connector are usually transitionally connected through a printed circuit board (PCB). The PCB and the pin are welded inside the motor, which will cause a series of problems, such as pseudo soldering, pads peeling off, and solder beads splashing to gears; in addition, the high labor cost of welding process will also lead to high overall manufacturing costs of the motor.

Dishwasher is a kind of household appliance, which needs to cyclically switch between a plurality of water flow channels in operation. Water divider is usually connected to the water diversion valve of the dishwasher and is used to drive the cyclic switching of the direction of the water flow channel in the water diversion valve. In order to achieve a precise water diversion control, a motor is usually used to drive the water divider. Therefore, the above problems also exist in water dividers and dishwashers with the above motors.

At least one embodiment of the present disclosure provides a motor 100, which includes a housing 1, a coil assembly 2, a lead portion 3, a terminal connecting device 5, and an isolation component 6. The housing 1 may accommodate the coil assembly 2. The lead portion 3 is electrically connected to the coil assembly 2 and is configured to be electrically connected to the external connector 4. The terminal connecting device 5 is connected to the housing 1 and is configured to receive the lead portion 3 and the external connector 4, such that the lead portion 3 is electrically connected to the external connector 4. The isolation component 6 is fixed to the terminal connecting device 5 and encloses the live part of the lead portion 3 together with terminal connecting device 5. Both the terminal connecting device 5 and the isolation component 6 are made from a flame-resistant material.

The motor 100 provided by at least one embodiment of the present disclosure requires the use of the flame-resistant material with higher cost for only the parts of the terminal connecting device 5 and the isolation component 6 so as to reduce the material cost. In addition, the present disclosure adopts the wiring scheme realized by elastic connection of the terminal 52 and pins 31 to avoid the welding process inside the motor, thereby avoiding the complicated installation and technical problems caused by welding involved in the scheme of connection via the PCB.

In addition, the water divider 200 and the dishwasher 300 having the water divider 200 provided by at least one embodiment of the present disclosure include the motor 100 described above, and thus have the same technical advantages.

The motor 100 according to an embodiment of the present disclosure will be described below according to FIGS. 1 to 8B. FIG. 1 shows a perspective view of a motor according to an exemplary embodiment of the present disclosure. As shown in FIG. 1, a motor 100 may include a housing 1, an output shaft 101, a cover plate 11 and a terminal connecting device 5.

The housing 1 may accommodate the coil assembly 2, the rotor assembly 20, and the lead portion 3 of the motor 100. The housing 1 may include a lug 14 for snap-connecting to a water divider.

The terminal connecting device 5 is connected to the housing 1. In the present embodiment, the terminal connecting device 5 is detachably connected to the housing 1. In other embodiments, the terminal connecting device 5 may also be fixedly and non-detachably connected to the housing 1. The terminal connecting device 5 may include a main body 51 and a receptacle 53 integrally formed with the main body 51. The main body 51 includes three main body side walls 513, 514, 515 arranged in a generally U shape, and the three main body side walls 513, 514, 515 defines a cavity 511. The receptacle 53 is integrally formed with the main body 51 and is configured to accommodate the external connector 4.

The lead portion 3 includes pins 31 and a support component 32, and the pins 31 are electrically connected to the coil assembly 2 of the motor and the terminal 52. The support component 32 supports and accommodates the pins 31, and fixes and holds the pins 31 on the coil assembly 2.

A motor output shaft 101 may be connected to a water diversion drive shaft 7 of the water divider 200 to output the driving force of the motor 100 to the water divider 200.

A cover plate 11 is fixedly installed on the housing 1, and is configured to close an opening 12 of the housing 1, thereby physically isolating the motor 100 from the environment. The cover plate 11 includes a cover plate opening, and the motor output shaft 101 may extend outwardly through the cover plate opening and be rotatably provided on the cover plate 11.

Figure 2:
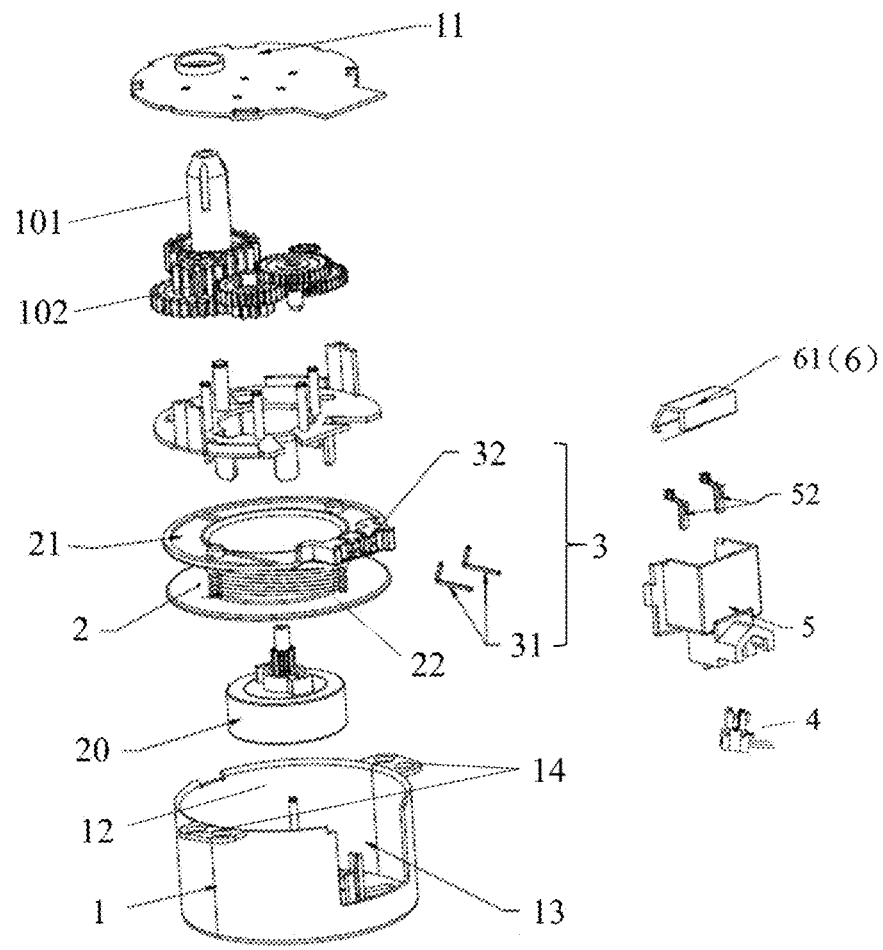
FIG. 2 shows an exploded view of the motor shown in FIG. 1.

FIG. 2 shows an exploded view of the motor 100 shown in FIG. 1. As shown in FIG. 2, the housing 1 is provided with an opening 12, and typical components of the motor 100, such as a rotor assembly 20, the coil assembly 2, the transmission component 102, and so on, may be accommodated inside the housing 1 through the opening 12. Specifically, the coil assembly 2 may include a skeleton 21 and an enameled wire 22 wound on the skeleton 21. The transmission component 102 is configured to reduce the speed of rotation of the output shaft of the rotor assembly 20 and output it to the output shaft 101. The transmission component 102 may adopt a reduction gear assembly commonly used in the art.

In the present embodiment, considering that the cover plate 11 needs sufficient mechanical strength to fix the gear shaft of the reduction gear assembly of the transmission component 102, the cover plate 11 may be made from a metal material. In addition, in other embodiments, the cover plate 11 may be eliminated and the lower end cover 82 may be used to fix the motor output shaft 101.

The lead portion 3 includes the pins 31, the support component 32, and one or more terminals 52 made from a conductive material. The pins 31 are electrically connected to the coil assembly 2, specifically, to the enameled wire 22. The pins 31 may be installed on the coil assembly 2 and electrically connected to the coil assembly 2 by any mounting method known in the art, for example, by welding, which will not be repeatedly described herein. The support component 32 is fixedly provided on the coil assembly 2 for supporting and accommodating the pins 31, and fixing and holding the pins 31 on the coil assembly 2, specifically, on the skeleton 21 of the coil assembly 2.

Each terminal 52 includes a first terminal portion 521 and a second terminal portion 522. The first terminal portion 521 is electrically connected to the pins 31, the second terminal portion 522 is configured to be electrically connected to the external connector 4, and the terminal 52 is installed in the cavity 511 of the main body 51. The live part of the lead portion 3 is the pins 31 and the one or more terminals 52. For example, in the present embodiment, the number of terminals 52 may be two.

The terminal connecting device 5 is detachably provided on the housing 1 and may receive the lead portion 3 of the motor 100 and the external connector 4, so that the lead portion 3 and the external connector 4 are electrically connected. The terminal connecting device 5 may include a main body 51 and a receptacle 53 integrally formed with the main body 51. FIG. 3A shows a perspective view of a terminal connecting device 5 according to an exemplary embodiment of the present disclosure, and FIG. 3B shows another perspective view of the terminal connecting device 5 shown in FIG. 3A. As shown in FIGS. 3A and 3B, the main body 51 includes three main body side walls 513, 514, 515 arranged in a generally U shape, and the three main body side walls 513, 514, 515 define the cavity 511. The two opposite main body side walls 513, 515 of the main body 51 are provided with a locating slot 512, respectively. The receptacle 53 is configured to accommodate the external connector 4.

The housing 1 also includes a notch 13 on the side wall of the housing 1. The notch 13 communicates with the opening 12 of the housing 1, and the terminal connecting device 5 is fixedly mounted on the radial outer side of the housing 1 and covers the notch 13. The terminal connecting device 5 is used to replace the rear cover of a typical motor, and the motor 100 according to at least one embodiment of the present disclosure does not require a rear cover, which can save materials, therefore reduce costs, and ensure the reliability of electrical connection.

Figure 3D:
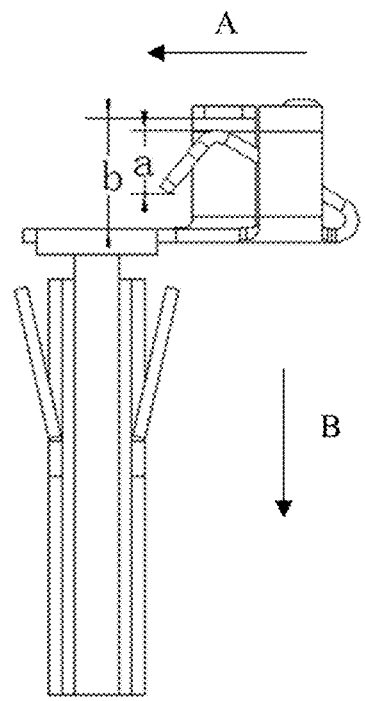
FIG. 3D is a front view of the terminal shown in FIG. 3C.
Figure 3E:
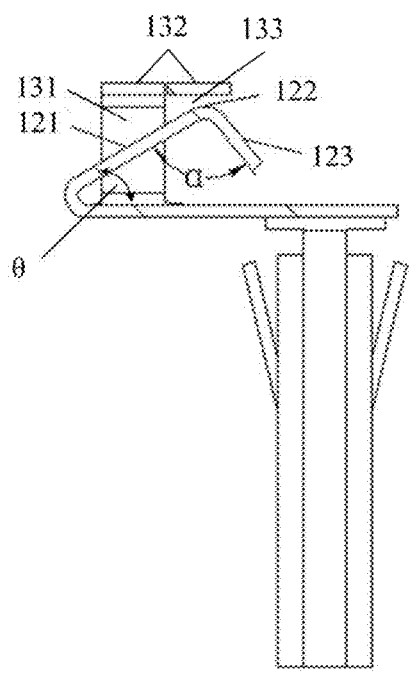
FIG. 3E is a cross-sectional view of the terminal shown in FIG. 3C.
Figure 3F:
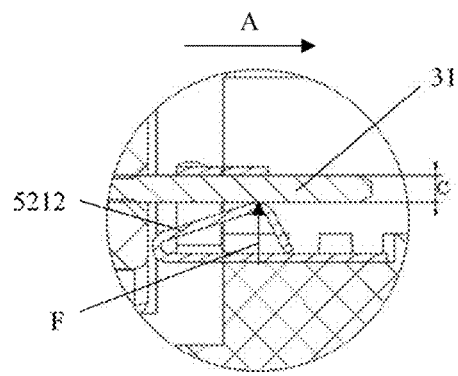
FIG. 3F is a partial enlarged view of the terminal shown in FIG. 3E, which shows an engaged state when the pin and the first terminal portion are engaged.

FIG. 3C shows a perspective view of a terminal 52 according to an exemplary embodiment of the present disclosure, FIG. 3D is a front view of the terminal shown in FIG. 3C. FIG. 3E is a cross-sectional view of the terminal shown in FIG. 3C. FIG. 3F is a partial enlarged view of the terminal shown in FIG. 3E, which shows an engaged state when the pin and the first terminal portion are engaged.

The terminal 52 includes a first terminal portion 521 and a second terminal portion 522. The first terminal portion 521 includes a first body 5211 and an elastic contact 5212. The first body 5211 defines a first insertion direction A for inserting the pins 31. The elastic contact 5212 extends from the first body 5211 and is configured to be elastically deformed with the insertion of pins 31 to apply contact force to the pins 31. The second terminal portion 522 includes a second body 5221, and the second body 5221 defines a second insertion direction B into the external connector 4. The terminal 52 further includes a bending portion 523, and the first terminal portion 521 and the second terminal portion 522 are connected via the bending portion 523, such that the first insertion direction A and the second insertion direction B are approximately perpendicular.

In the present embodiment, the first terminal portion 521, the second terminal portion 522 and the bending portion 523 are integrally formed, for example, by stamping. The first terminal portion 521 and the second terminal portion 522 are connected via the bending portion 523, and the bending portion 523 is disposed on either side of the end opposite to the elastic contact 5212 on the first body 5211. In the present embodiment, the bending portion 523 is disposed on the end opposite to the elastic contact 5212 and is located on a side surface facing the paper outwardly in FIG. 3C. The bending portion 523 may also be disposed in other positions, such as a side surface facing the paper inwardly, or the end side surface directly opposite to the elastic contact 5212, which will be described in subsequent embodiments. The bending portion 523 has a bent right-angle shape, so the first terminal portion 521 and the second terminal portion 522 are bent approximately perpendicular, so that the first insertion direction A and the second insertion direction B are approximately perpendicular. The bending portion 523 may also have a cutout 5231, which can simplify the structure and save material.

It should be noted that the "approximately perpendicular" mentioned in the present invention refers to 90 degrees or approximately equal to 90 degrees. Taking into account the actual production situation, it is very difficult to achieve complete perpendicularity between two components, that is, to be exactly 90 degrees. However, in actual applications, with respect to a certain deviation from 90 degrees, such as plus or minus 5 degrees, the technical effects of the present invention can also be achieved.

The terminal 52 is made from a conductive material commonly used in the art, such as copper, aluminum, copper alloy or aluminum alloy, etc., preferably, copper or copper alloy. And the thickness of the material is between 0.2 mm and 0.5 mm, for example 0.3 mm, and it is preferable to use die stamping and integral molding. The choice of material thickness mainly considers the following factors: if the material thickness is too thin, for example, less than 0.2 mm, the mechanical strength of the finished terminal is too weak to meet the requirements of terminal insertion strength; if the material thickness is too thick, for example, greater than 0.5 mm, it will cause the elastic coefficient of the elastic contact 5212 to be too large, making assembly difficult. At the same time, due to the increase of the material thickness, the overall size of the terminal will inevitably increase, which will cause the entire installation space to become large, resulting in waste of space and material costs.

In the present embodiment, the first terminal portion 521 further includes at least one limiting portion 5213 formed by bending from the side of the first body 5211, preferably two limiting portions 5213. Each limiting portion 5213 includes a side wall 131 and a top wall 132. The limiting portion 5213 and the first body 5211 enclose to form a pin cavity 133 for receiving the pins 31.

The elastic contact 5212 includes an elastic arm 121, a contact protrusion 122 and a support arm 123. The elastic arm 121 is bent relative to the first insertion direction A to form a first angle θ. The elastic arm is configured to bend and deform in a direction that reduces the first angle θ with the insertion of the pins 31 to generate a contact force. The contact protrusion 122 is configured to contact the pins 31 to apply the contact force. Specifically, the contact protrusion 122 of the elastic contact 5212 applies the component force F of the contact force to the pins 30 along a direction perpendicular to the first insertion direction A.

In the present embodiment, the first body 5211 includes a bottom wall 5214, and the elastic contact 5212 bends and extends from the bottom wall 5214 along the first insertion direction A, so that when the pins 31 are inserted into the pin cavity 133 along the first insertion direction A, an elastic connection is formed between the pins 31 and the top wall 132 and the contact protrusion 122.

The support arm 123 extends from the contact protrusion 122 and forms a second angle α with the elastic arm 121, so that the elastic arm 121 and the support arm 123 form a generally V-shape. As shown in FIG. 3D, the height of the support arm 123 perpendicular to the first insertion direction A is a, the height of the pin cavity 133 perpendicular to the first insertion direction A is b, and b may also be defined as the distance between the bottom surface of the top wall 132 and the surface of the first body 5211. The maximum dimension of the cross section of the pins 31 is c, and the above parameters are designed to satisfy the following relationship: b−a<c and a<b. In practical applications, the size of the pins 31 is given, so c may be regarded as a constant. Therefore, the size of the parameters a and b may be adjusted according to the above relationship. The value of b−a may be considered as the gap between the contact protrusion 122 and the top wall 132 in the uninserted state, and satisfying b−a<c may ensure that the pins 31 can drive the deformation of the elastic contact 5212 when being inserted, especially the deformation of the elastic arm 121, so that the first angle θ becomes smaller. At this time, the contact protrusion 122 tightly engages the pins 31, that is, an interference fit is formed between the elastic contact 5212 and the pins 31. Satisfying a<b is to ensure that the above gap is greater than zero. Those skilled in the art will readily know that the design of the size of the first angle θ and the second angle α should take into account the dimensional relationship of each part of the elastic contact 5212. For example, the first angle θ may range from 15 degrees to 50 degrees, such as 15 degrees, 20 degrees, 30 degrees and 50 degrees; the second angle α may range from 90 degrees to 130 degrees, such as 100 degrees, 110 degrees and 130 degrees. It can be seen that the second angle α is an obtuse angle. This design mainly takes into account that the support arm 123 contacts the first body 5211 when the elastic arm 121 deforms toward the first body 5211, and slides along the direction A to facilitate the insertion of the pins 31 and support the elastic contact 5212 at the meantime, thus preventing the elastic arm 121 from failing due to excessive deformation, and it may also prevent the elastic contact 5212 from damage when improperly sized (oversized) pins 31 or other connectors are inserted.

The cross-sectional shape of the second body 5221 of the second terminal portion 522 may be rectangular or U-shaped, including at least two second side walls 211 extending along the second insertion direction B, which are configured to be in electrical contact with the electrical contact portion of the external connector 4 when the external connector 4 is inserted. Specifically, the second body 5221 may include two second side walls 211. When the external connector is a RAST connector, the electrical contact portion may be two contact springs, and the two second side walls 211 are used to respectively engage the two contact springs of the external connector 4 when the external connector 4 is inserted. In the present embodiment, the cross-sectional shape of the second body 5221 is U-shaped and extends along the second insertion direction B.

The structure of the terminal 52 according to the exemplary embodiment is described above, and the manufacturing method of the terminal 52 of the present embodiment is briefly described below. The manufacturing method is only exemplary, and the terminal 52 may also be manufactured by other conventional methods in the field. First, a copper plate material with a thickness of 0.3 mm is provided, and the first terminal portion 521, the second terminal portion 522 and the bending portion 523 of the terminal 52 are stamped on the copper plate. At this time, the three parts are in the same plane. Then, bend the various characteristic parts of the first terminal portion 521 and the second terminal portion 522, including but not limited to the elastic contact 5212, the elastic arm 121, the contact protrusion 122, the support arm 123, the limiting portion 5213 and the second side wall 21, etc. Finally, the bending portion 3 is bent at 90 degrees so that the first terminal portion 521 and the second terminal portion 522 are perpendicular to each other, thereby forming the terminal 52 of the present embodiment.

Figure 4A:
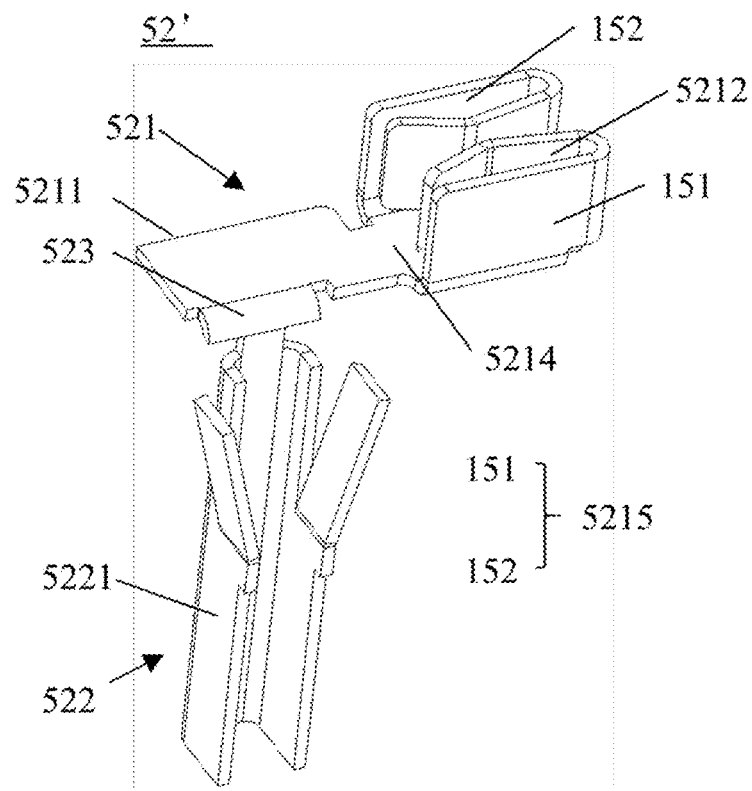
FIG. 4A shows a perspective view of a terminal according to another embodiment of the present disclosure.
Figure 4B:
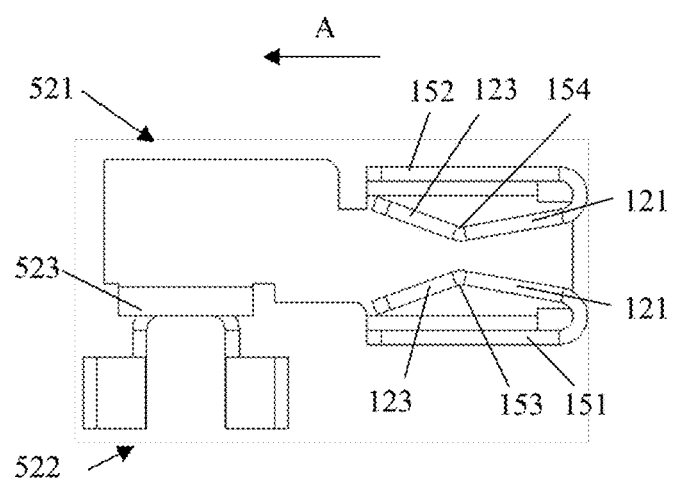
FIG. 4B is a top view of the terminal shown in FIG. 4A.

Referring to FIGS. 4A to 4B, which show a terminal 52' according to another exemplary embodiment of the present invention. FIG. 4A shows a perspective view of a terminal according to another embodiment of the present disclosure, FIG. 4B is a top view of the terminal shown in FIG. 4A. In the following, only the differences between the present embodiment and the embodiments shown in FIGS. 3C to 3F will be described, and the similarities will not be repeated here. Compared with the embodiments shown in FIGS. 3C to 3F, the arrangement of the elastic contact 5212 in the present embodiment is different. Specifically, the elastic contact 5212 is formed by bending from the surface of a pair of side wings 5215 toward each other, and the side wings 5215 are formed by bending from the side of the first body 5211. In the present embodiment, a pair of side wings 5215 forms a pair of side wings 151, 152, which are bent toward each other to form a pair of contact protrusions 153, 154.

As shown in FIG. 4B, the elastic contact 5212 is bent into a V shape, which is similar to the V shape of the embodiment shown in FIGS. 3C to 3F, except that when the pins 31 are inserted along the first insertion direction A, an elastic connection is formed between the pins 31 and the pair of contact protrusions 153, 154.

Figure 17:
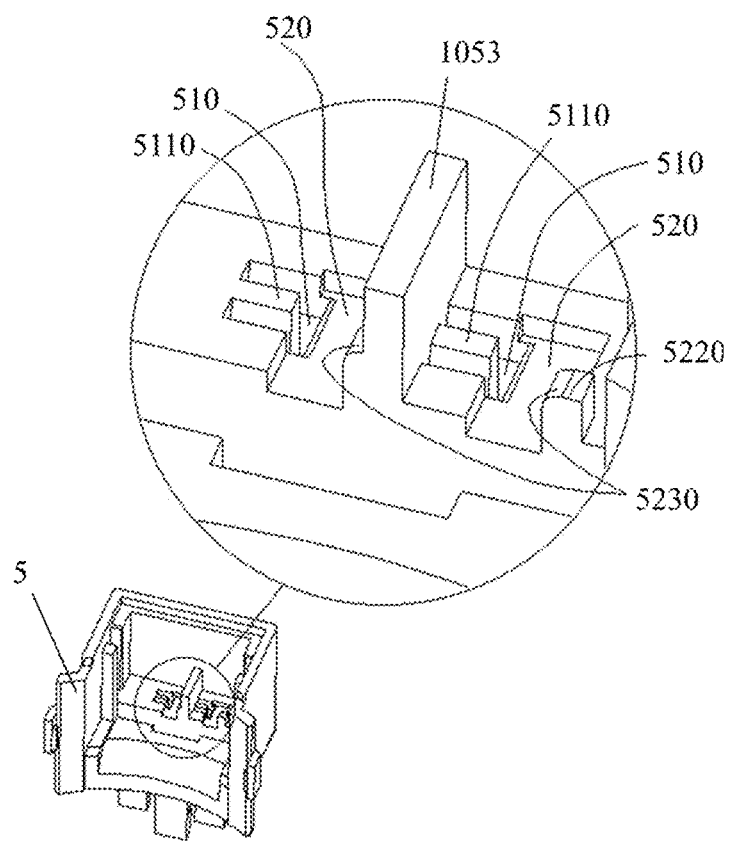
FIG. 17 shows a partial enlarged view of the main body of the terminal connecting device according to an exemplary embodiment of the present disclosure.
Figure 18:
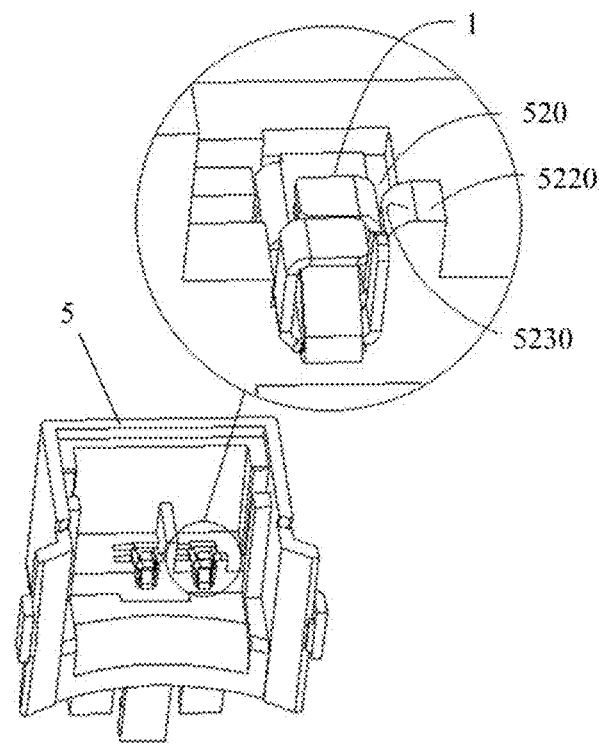
FIG. 18 shows a partial enlarged view of the terminal connecting device mounted with terminals.
Figure 19:
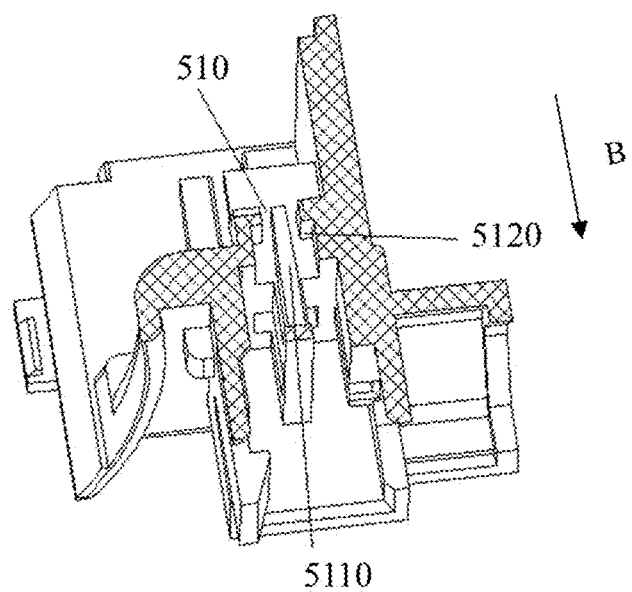
FIG. 19 shows a cross-sectional view of a terminal connecting device according to an exemplary embodiment of the present disclosure.
Figure 20:
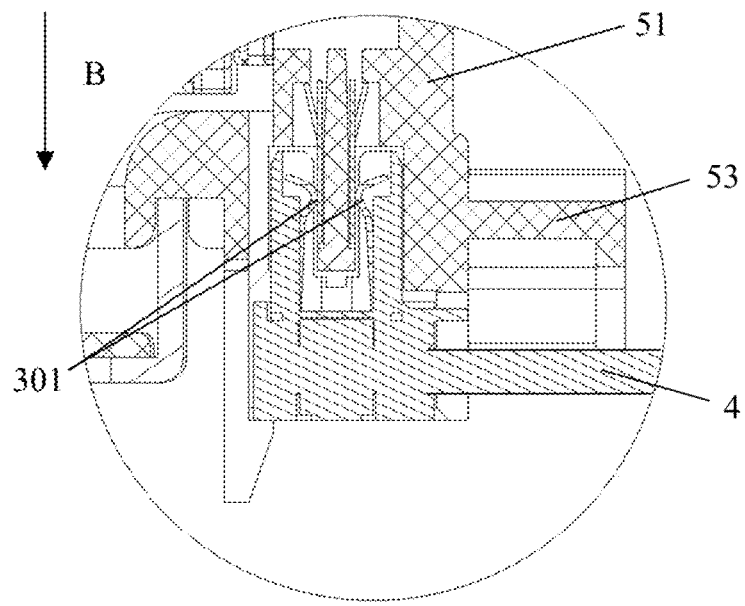
FIG. 20 shows a cross-sectional view of a cross-sectional view of a terminal connecting device after installation with an external connector according to an exemplary embodiment of the present disclosure.

FIG. 17 shows a partial enlarged view of the main body of the terminal connecting device according to an exemplary embodiment of the present disclosure. FIG. 18 shows a partial enlarged view of the terminal connecting device installed with terminals. FIG. 19 shows a cross-sectional view of a terminal connecting device according to an exemplary embodiment of the present disclosure. FIG. 20 shows a cross-sectional view of a cross-sectional view of a terminal connecting device after installation with an external connector according to an exemplary embodiment of the present disclosure.

The installation between the terminal connecting device 5 and the terminal 52 according to an exemplary embodiment of the present invention will be described below in conjunction with FIGS. 3A-3B and 17 to 20. The terminal connecting device 5 includes a main body 51 and a receptacle 53, and the main body 51 and the receptacle 53 may be formed integrally by injection molding.

The main body 51 is provided with a plurality of mounting holes 510 for accommodating the second terminal portion 522 of the terminal 52 and a plurality of mounting slots 520 for accommodating the first terminal portion 521 of the terminal 52. The mounting holes 510 are arranged adjacent to the corresponding mounting slots 520 to form mounting pairs, and each mounting pair is provided with a terminal 52. In the present embodiment, the main body 51 includes two mounting pairs formed by the mounting holes 510 and the mounting slots 520 to install two terminals 52 respectively.

The mounting slot 520 is mainly used to engage the first terminal portion 521 of the terminal 52. A mounting gap between the mounting slot 520 and the first body 5211 of the first terminal portion 521 is between 0 and 0.5 mm, and the depth of the mounting slot 520 is greater than or equal to the height of the first body 5211 of the first terminal portion 521, so that the first terminal portion 521 may be completely inserted into the mounting slot 520. Each mounting slot 520 includes a limit boss 5220 that protrudes from one side wall of the mounting slot 520 and engages the first terminal portion 521 of the terminal 52 (specifically, the first body 5211) as the terminal 52 is inserted along the second insertion direction B to position the terminal 52 in the mounting slot 520 and limit the vibration of the terminal 52 by the limit boss 5220, so as to ensure the stable installation of the terminal 52.

An end of the limit boss 5220 may also be provided with a chamfer 5230 as shown in FIG. 18, the chamfer 5230 may facilitate installation and disassembly, and prevent processing burrs from hindering installation or causing injury to the user.

The mounting holes 510 are mainly used to accommodate the second terminal portion 522 of the terminal 52. Each mounting hole 510 includes a guiding positioning rib 5110 and an anti-detachment boss 5120. The guiding positioning rib 5110 is arranged in the mounting hole 510, and its width is slightly smaller than the width between the inner surfaces of the at least two second side walls 211 of the second terminal portion 522 to allow to be received between the inner surfaces of the at least two second side walls 211 of the second terminal portion 522. For example, the width of the guiding positioning rib 5110 is slightly smaller than the width between the inner surfaces of the two second side walls 211 of the second terminal portion 522. In the present embodiment, the fit gap of either side is not greater than 0.1 mm, which is helpful for the support of the sidewalls of the second terminal portion 522, so that when the second sidewall 211 of the second terminal portion 522 is elastically and electrically connected to the external connector 4, the clamping force of the external connector 4 on the second side wall 211 of the second terminal portion 522 is prevented from causing the side walls to shrink closer together, so as to prevent a failure of the electrical connection.

As shown in FIGS. 19 and 20, in order to better locate and fix the position of the second terminal portion 522, the side surface of the guiding positioning rib 5110 that contacts the inner surface of the second side wall 211 of the second terminal portion 522 has a draft angle, so that the thickness of the guiding positioning rib 5110 is gradually increased along the second insertion direction B, so as to facilitate the insertion and positioning of the second terminal portion 522. The anti-detachment boss 5120 protrudes from the inner surface of the mounting hole 510. As shown in FIG. 19, the anti-detachment boss 5120 is configured to form an engaging connection with the snap-fitting elastic member 1022 as the second terminal portion 522 is installed. The installation process of the second terminal portion 522 will be described in detail later.

In addition, since the terminals 52 are live (with electricity) during operation, insulating ribs 1053 are also provided between the adjacent mounting pairs to isolate and insulate the adjacent terminals 52, to ensure sufficient electrical clearance and creepage distance between the terminals 52, to prevent the occurrence of undesirable phenomenon such as inter-electrode short-circuit or leakage tracking between the terminals 52.

As shown in FIGS. 19 and 20, the receptacle 53 is used to accommodate the insertion of the external connector 4 in a direction opposite to the second insertion direction B, and to fix the external connector 4 by a snap connection.

For example, the external connector 4 may be a RAST connector. The external connector 4 may include a pair of contact elastic members 301 to apply a clamping force to the second side wall 211 of the second terminal portion 522 to achieve electrical connection.

Figure 21A:
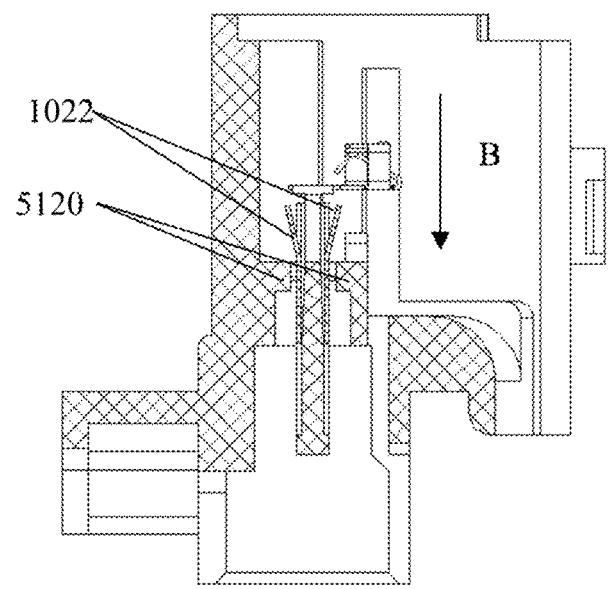
FIGS. 21A to 21C show cross-sectional views of the installation process of terminals according to an exemplary embodiment of the present disclosure.
Figure 21B:
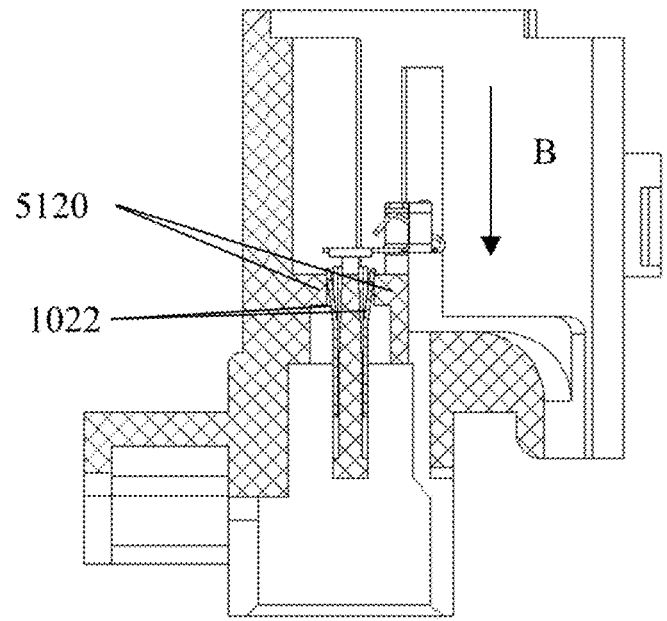
Figure 21C:
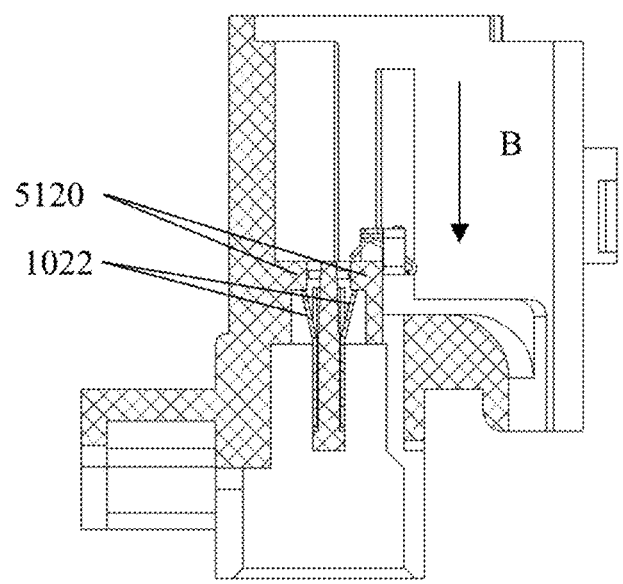

FIGS. 21A to 21C show cross-sectional views of the installation process of terminals according to an exemplary embodiment of the present disclosure. The installation process of the second terminal portion 522 in the main body 51 will be described below with reference to FIGS. 21A to 21C. In the present embodiment, the second terminal portion 522 may be, for example, the structure in the embodiments of FIGS. 3C to 3E or FIGS. 4A to 4B, that is, the second terminal portion 522 includes two snap-fitting elastic members 1022 extending from the second side wall 211.

FIG. 21A shows the state before the snap-fitting elastic member 1022 contacts the anti-detachment boss 5120 during the insertion of the terminal 52. At this time, a free portion 222 of the snap-fitting elastic member 1022 extends obliquely with respect to the second body 5221 and is not subjected to force. FIG. 21B shows the state when the snap-fitting elastic member 1022 is in contact with the anti-detachment boss 5120 during the insertion of the terminal 52. At this time, the free portion 222 of the snap-fitting elastic member 1022 is in contact with the anti-detachment boss 5120, and is deformed under the force by the surface of the anti-detachment boss 5120. At this time, the force in the second insertion direction B is continued to be applied to the terminal 52. As shown in FIG. 21C, the terminal 52 is completely inserted into the main body 51, and the free portion 222 is not subjected to force and returns to the normal shape. At this time, the free portion 222 is in contact with the lower part of the anti-detachment boss 5120, and at the same time, the inner surface of the second side wall 211 of the second terminal portion 522 is in close contact with the limit boss 5220, and therefore, the movement of the terminal 52 in the second insertion direction B is restricted, and the installation of the terminal 52 is completed. Afterwards, the external connector 4 may be inserted into the receptacle 53 and electrically connected to the second terminal portion 522 of the terminal 52, as shown in FIG. 20.

Figure 22:
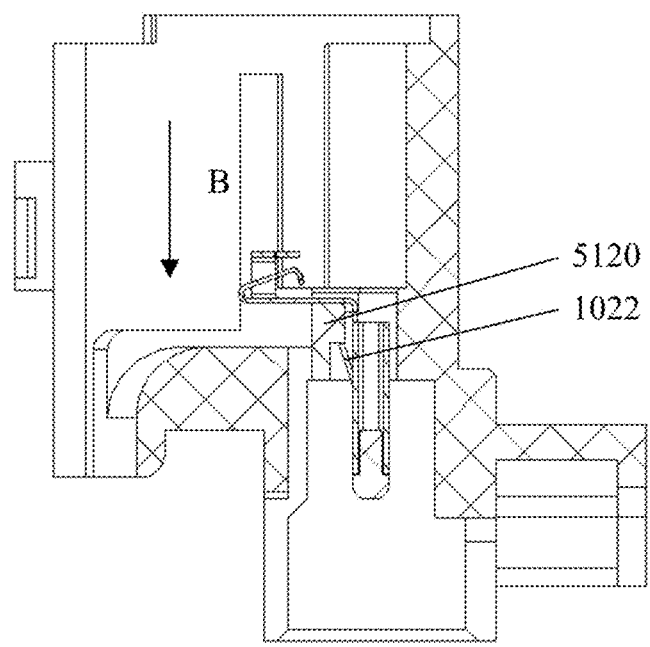
FIG. 22 shows a cross-sectional view showing the installation process of terminals according to another embodiment of the present disclosure.

FIG. 22 shows a cross-sectional view of the second terminal portion 522 installed in the main body 51 according to still another alternative embodiment. Different from the foregoing embodiments, the second terminal portion 522 in this embodiment may include, for example, one snap-fitting elastic member 1022 provided on the surface connecting the two second side walls 211. At this time, the number of the anti-detachment boss 5120 may also be one, and the installation process and principle are similar to the foregoing embodiments. FIG. 22 shows a state where the second terminal portion 522 is locked and positioned after installation.

Figure 5A:
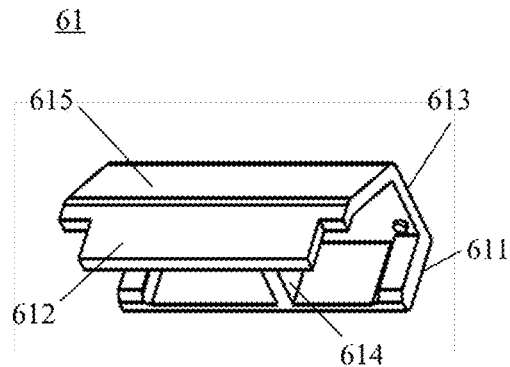
FIG. 5A shows a perspective view of a shield according to an exemplary embodiment of the present disclosure.
Figure 5B:
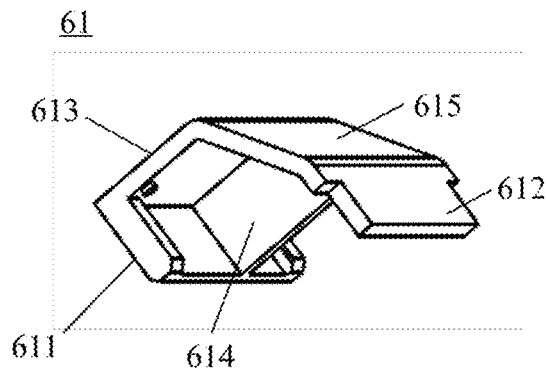
FIG. 5B shows a perspective view from another perspective of the shield according to an exemplary embodiment of the present disclosure.

In an exemplary embodiment, the isolation component 6 is a shield 61. FIG. 5A shows a perspective view of the shield 61 according to an exemplary embodiment of the present disclosure, FIG. 5B shows a perspective view from another perspective of the shield 61 according to an exemplary embodiment of the present disclosure. As shown in FIGS. 5A and 5B, the shape of the shield 61 is generally U-shaped, including a first side wall 611 and a second side wall 612 opposite to the first side wall 611, and the first side wall 611 is inserted into a locating slot 512. The first side wall 611 is inserted into the locating slot 512, and the shield 61 may be positioned on the main body 51 of the terminal connecting device 5. In the present embodiment, the shield further includes a top wall 613, a rib 614, and an intermediate wall 615 connecting the second side wall 612 and the top wall 613. The rib 614 extends inside the shield 61. By providing the ribs 614, the heads of two adjacent pins 31 may be isolated, and the distance between the remaining ends of the enameled wire 22 wrapped around the heads of the pins 31 may be prevented from being too short or short-circuited. In addition, the ribs 614 may also increase the strength of the shield 61 and reduce the plastic deformation of the shield 61. The present disclosure is not limited thereto, and the shield 61 may also have other shapes or structures, as long as the live part of the cavity 511 can be closed.

Referring to FIGS. 5A and 5B, the shape of the shield 61 is generally U-shaped, and may be configured to enclose the live part of the cavity 511 of the main body 51. Specifically, the shield 61 encloses the part in the cavity 511 of the main body 51 where the terminal 52 and the pins 31 are electrically connected.

For example, the shield 61 and the main body 51 are both made from a flame-resistant material. In the electrical connection mode shown in the present embodiment, the terminal 52 and the pins 31 form the live part of lead portion 3 when the motor 100 is in operation. The parts around the live part, that is, the shield 61 and the main body 51 are both made from a flame-resistant material, thus meeting the safety requirements. At the same time, it can be seen from the figure that the size of both the main body 51 and the shield 61 is smaller than that of the housing 1 or the water divider housing 8, so the use of a flame-resistant material may be saved as a whole, thereby reducing material costs.

Figure 6:
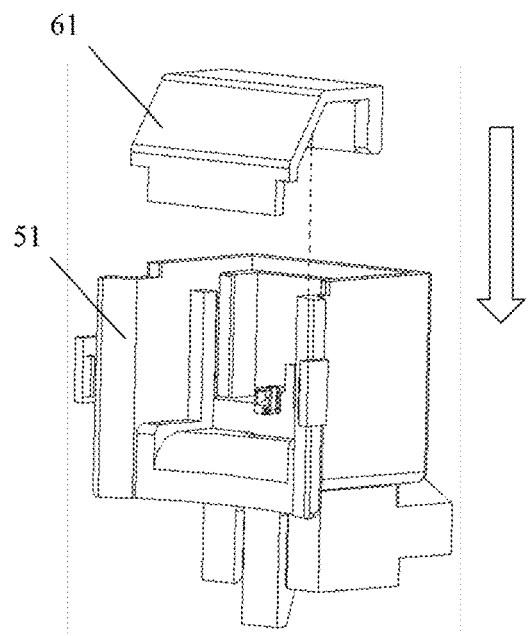
FIG. 6 shows a schematic diagram of the installation of a shield according to an exemplary embodiment of the present disclosure.

FIG. 6 shows a schematic diagram of the installation of a shield according to an exemplary embodiment of the present disclosure. When installing, the terminal 52 is firstly install in the main body 51, and electrically connect to the pins 31 of the lead portion 3. Next, the shield 61 is inserted into the main body 51 along the arrow direction in FIG. 6, and the first side wall 611 of the shield 61 is inserted into the locating slot 512 and engaged with the locating slot 512.

Figure 7:
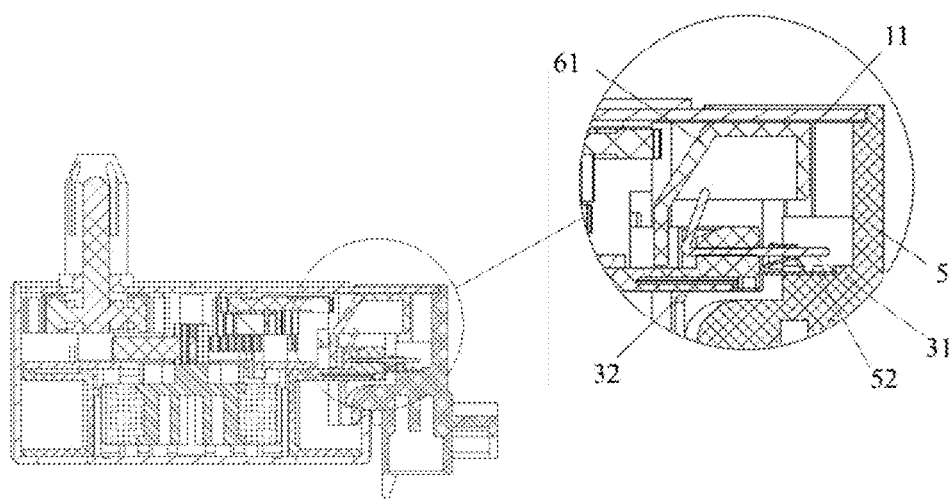
FIG. 7 shows a cross-sectional view of the motor shown in FIG. 1, which shows a partial enlarged view of the mating relationship of the shield.

FIG. 7 shows a cross-sectional view of the motor shown in FIG. 1, which shows a partial enlarged view of the mating relationship of the shield. The relationship between the components after installation is shown in the partial enlarged view of FIG. 7. It can be seen from FIG. 7 that the shield 61 encloses the part in the cavity 511 of the main body 51 where the terminal 52 and the pins 31 are electrically connected, that is, encloses the live part of the lead portion 3 of the motor 100.

Figure 8A:
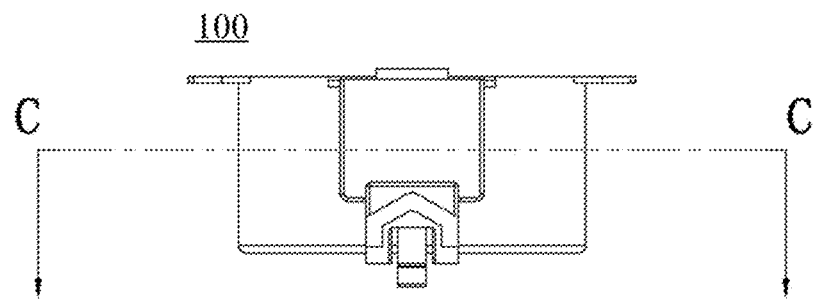
FIG. 8A shows a side view of the motor shown in FIG. 1.
Figure 8B:
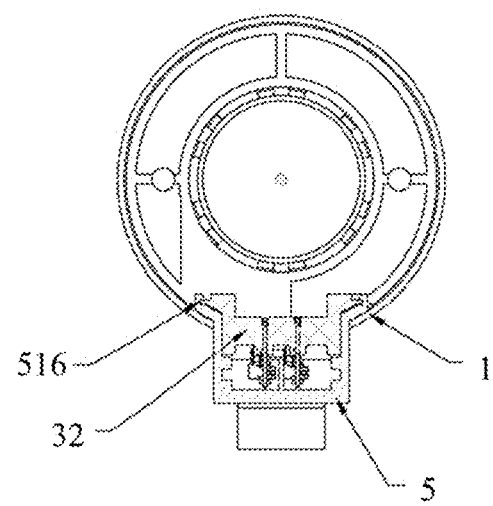
FIG. 8B shows a cross-sectional view along the line C-C of FIG. 8A.

FIG. 8A shows a side view of the motor shown in FIG. 1, FIG. 8B shows a cross-sectional view along the line C-C of FIG. 8A. Two main body side walls 513, 515 opposite to each other of the three main body side walls 513, 514, 515 include snaps 516 extending from edges thereof configured to be snap-connected to the support component 32. In the present embodiment, as shown in FIG. 3A, the snaps 516 extends obliquely from the two opposite main body side walls 513, 515 toward the opening direction of the three main body side walls 513, 514, 515, so as to be able to snap-engage with the corresponding part of the support component 32.

In the actual assembly, the pins 31 are firstly connected to terminal 52, the snaps 516 are snap-connected to the support component 32, and then the main body 51 of the terminal connecting device 5 is mounted to the housing 1. At this time, the outer surface of the snaps 516 of the main body 51 of the terminal connecting device 5 fits with the inner surface of the edge of the notch 13 of the housing 1, as shown in FIG. 8B.

Figure 9:
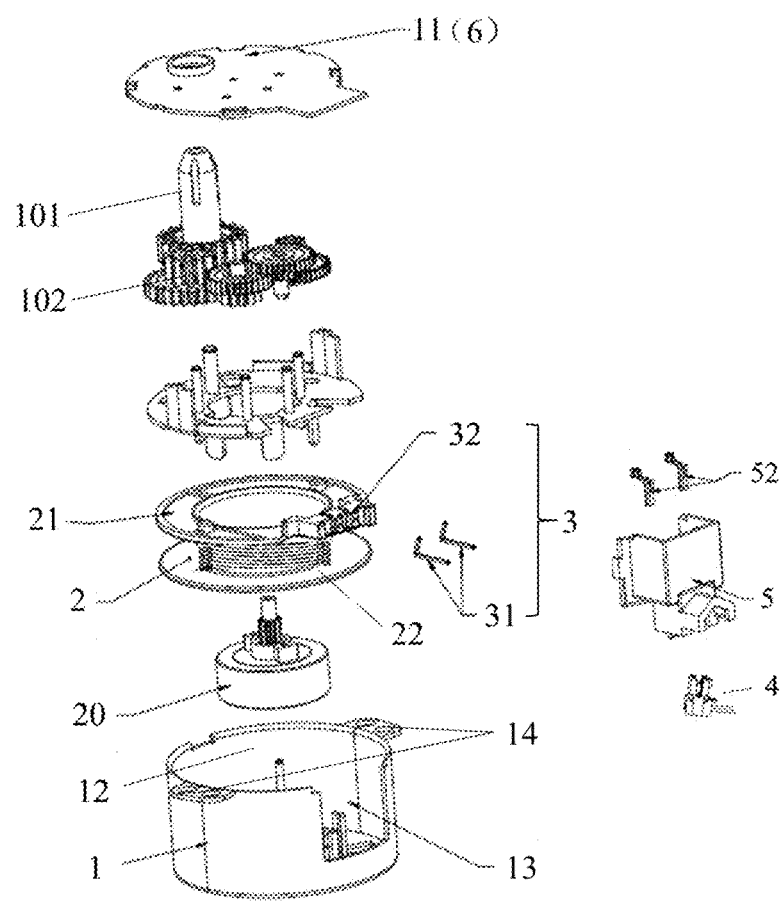
FIG. 9 shows an exploded view of a motor according to another exemplary embodiment of the present disclosure.

FIG. 9 shows an exploded view of a motor 100 according to another exemplary embodiment of the present disclosure. In the following, only the differences between the present embodiment and the embodiments shown in FIGS. 1 to 7B will be described, and the similarities will not be repeated here. Compared with the embodiments shown in FIGS. 1 to 7B, the isolation component 6 of the present embodiment is different. Specifically, the isolation component 6 is a cover plate 11, which is fixedly installed on the housing 1, and is configured to close the opening 12 of the housing 1. In the present embodiment, the cover plate 11 may be made from a metal material.

In the present embodiment, the same structure of the shield 61 as in the previous embodiment may be used, or not. Since when the cover plate 11 is made from a flame-resistant material, the live part of the lead portion 3 is already surrounded by the cover plate 11 and the terminal connecting device 5. At this time, the shield 61 is optional but not necessary.

At least one embodiment of the present disclosure provides a water divider 200, including: the motor 100 as described above; a water diversion drive shaft 7 for switching the water flow direction of a dishwasher 300, the water diversion drive shaft 7 is in transmission connection with the motor 100; and a water divider housing 8 which accommodates the water diversion drive shaft 7 and is fixedly connected to the motor 100. The lead portion 3 of the motor 100 is isolated from the water divider housing 8 by the isolation component 6. The water divider housing 8 is made from a non-flame-resistant material.

Figure 10:
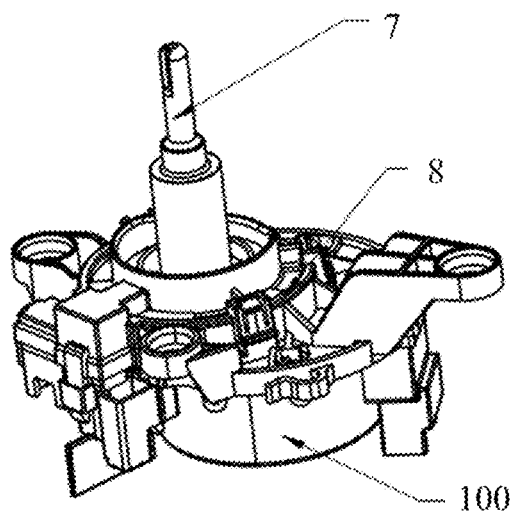
FIG. 10 shows a perspective view of a water divider according to an exemplary embodiment of the present disclosure.
Figure 11:
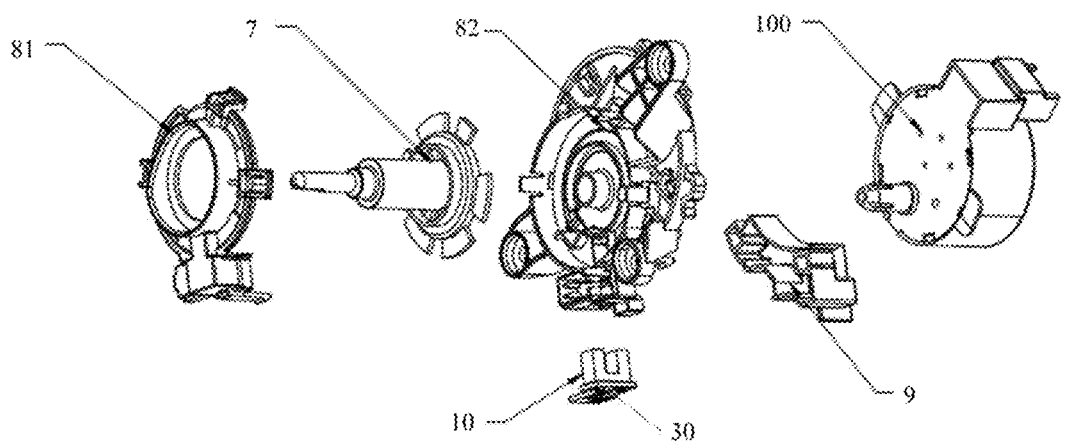
FIG. 11 shows an exploded view of the water divider shown in FIG. 10.

FIG. 10 shows a perspective view of a water divider 200 according to an exemplary embodiment of the present disclosure, FIG. 11 shows an exploded view of the water divider 200 shown in FIG. 10. The water divider 200 includes the motor 100, the water diversion drive shaft 7 and the water divider housing 8 as described above. The water diversion drive shaft 7 is in transmission connection with the motor 100. The water divider housing 8 accommodates the water diversion drive shaft 7 and is fixedly connected to the motor 100. The lead portion 3 of the motor 100 is isolated from the water divider housing 8 by the isolation component 6 and the terminal connecting device 5. The water divider housing 8 is made from a non-flame-resistant material. In other words, the isolation method of the lead portion 3 of the motor 100 and the water divider housing 8 is realized by setting the isolation component 6 and the terminal connecting device 5 between them.

The water divider housing 8 includes an upper end cover 81 and a lower end cover 82. The upper end cover 81 and the lower end cover 82 are enclosed to accommodate the water diversion drive shaft 7. The motor 100 is fixed on the lower end cover 82 and is snap-connected to the lower end cover 82.

The water separator 200 further includes a water storage element 9 which is fixedly installed on a side of the lower end cover 82 facing the motor 100 and is in fluid communication with the lower end cover 82.

Figure 12A:
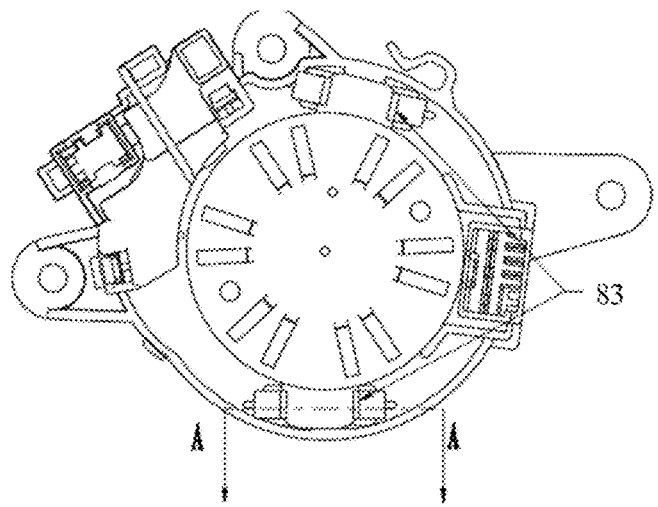
FIG. 12A shows a top view of the water divider shown in FIG. 10.
Figure 12B:
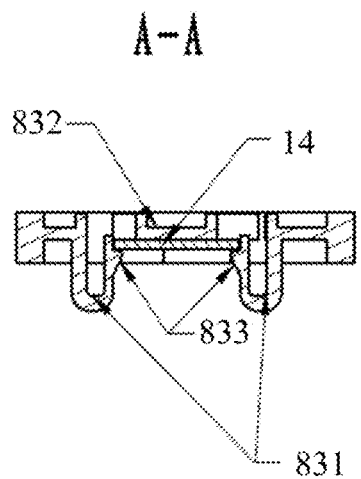
FIG. 12B shows a cross-sectional view taken along a line A-A of FIG. 12A.

FIG. 12A shows a top view of the water divider 200 shown in FIG. 10. FIG. 12B shows a cross-sectional view taken along the line A-A of FIG. 12A. In the present embodiment, preferably, the lower end cover 82 and the motor 100 are fixed by an engaging structure 83 of the lower end cover 82.

The engaging structure 83 includes an elastic part 831, a support part 832 and a barb 833. As mentioned above, the motor 100 is provided with two lugs 14 at the corresponding engaging positions. When the motor 100 is installed, the elastic part 831 expands toward both sides, so that the lugs 14 may slide over the barb 833 into the installation position smoothly. After the motor 100 is installed in place, the elastic part 831 springs back and fits with both sides of the lugs 14 so that the motor 100 will not vibrate. The support part 832 and the barb 833 may define the translational movement of the housing 1 of the motor 100 in the axial direction. The elastic portion 831 may define the rotational movement of the housing 1 of the motor 100 in the circumferential direction.

Compared with the traditional method of using screw structures to fix two parts, the structure provided in this embodiment does not require the use of screws and the process of tightening the screws, which reduces one part and one process, thus reducing costs.

Figure 13:
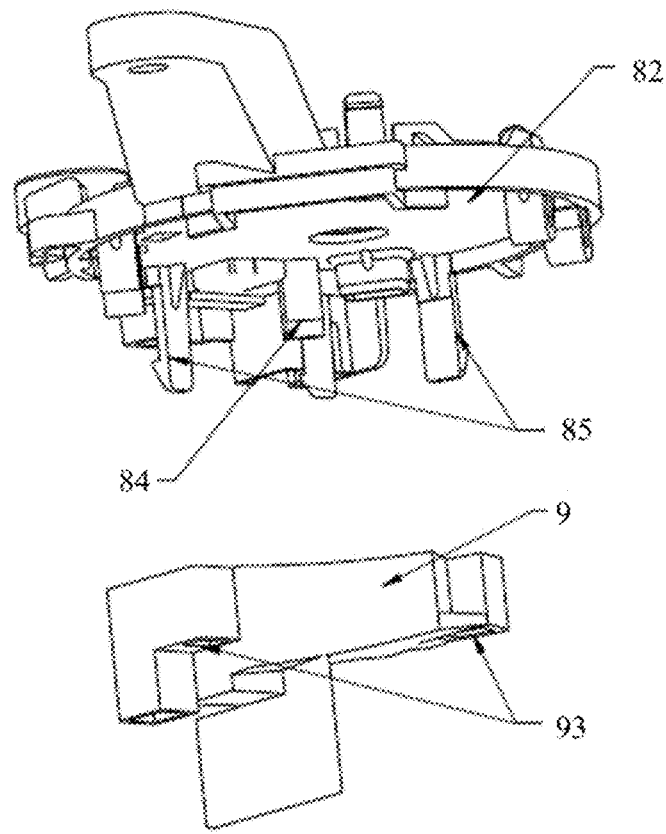
FIG. 13 shows an exploded view of a lower end cover and a water storage element according to an exemplary embodiment of the present disclosure.
Figure 14A:
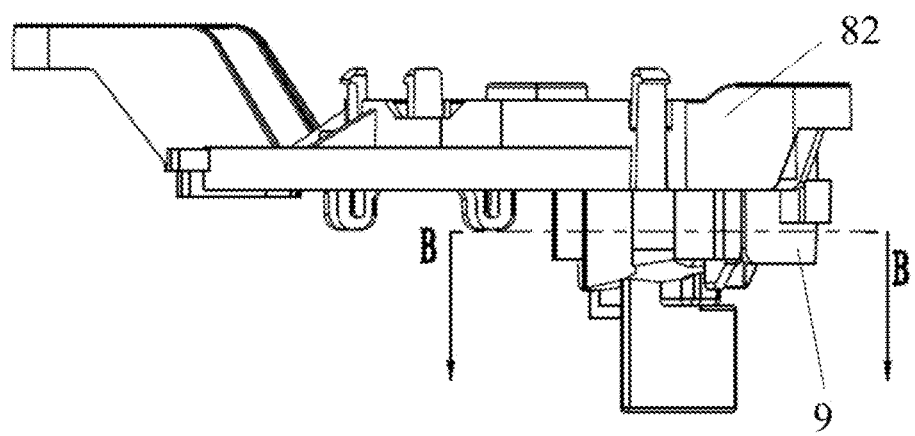
FIG. 14A shows a side view of a lower end cover and a water storage element according to an exemplary embodiment of the present disclosure.
Figure 14B:
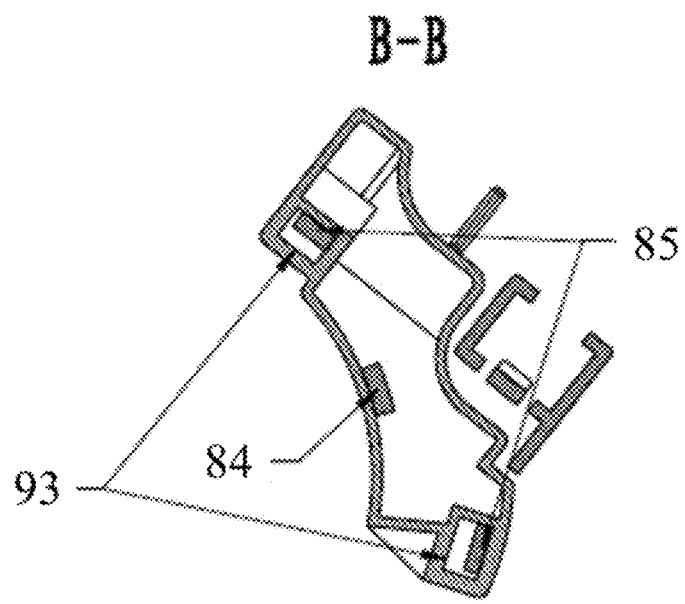
FIG. 14B shows a cross-sectional view taken along the line B-B of FIG. 14A.
Figure 14C:
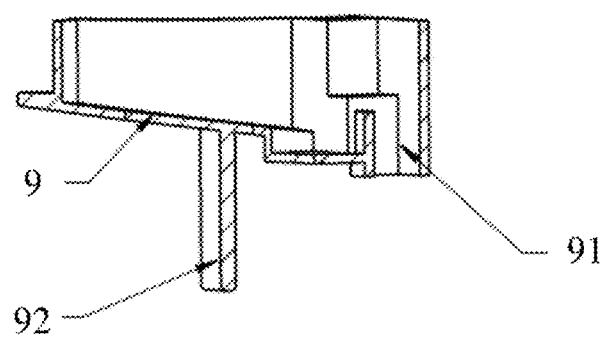
FIG. 14C shows a cross-sectional view of a water storage element according to an exemplary embodiment of the present disclosure.

FIG. 13 shows an exploded view of a lower end cover 82 and a water storage element 9 according to an exemplary embodiment of the present disclosure. FIG. 14A shows a side view of a lower end cover 82 and a water storage element 9 according to an exemplary embodiment of the present disclosure. FIG. 14B shows a cross-sectional view taken along the line B-B of FIG. 14A. FIG. 14C shows a cross-sectional view of a water storage element 9 according to an exemplary embodiment of the present disclosure.

As shown in FIGS. 13, 14A and 14B, the lower end cover 82 includes a hook 85 and a limit member 84, and the hook 85 and the limit member 84 respectively extend downward from the bottom of the water storage element 9. The water storage element 9 includes a locking slot 93 for engaging the hook 85. It can be seen in the cross-sectional view shown in FIG. 14B that the side wall of the hook 85 fits with the inner wall of the engaging slot 93 to apply force toward two non-parallel different directions, so that the water storage element 9 closely snap-connected to the lower end cover 82. The limit member 84 of the lower end cover 82 fits with the inner wall of the water storage element 9, and applies a reverse force on the water storage element 9 that is opposite to the resultant force of the forces of the two hooks 85 to ensure the radial force balance of the water storage element 9 and limit the installation position of the water storage element 9, and the stability of the installation of the water storage element 9 on the lower end cover 82 is maintained.

In a typical water separator structure, a water storage tank is usually integrated on the rear cover. The water storage element 9 provided in this embodiment is an independent structure. The entire water storage element 9 is small in size and simple to install. Moreover, the water storage element 9 is arranged separately from the lead portion 3 of the motor 100 to ensure safe use. At the same time, the water storage element 9 can be made from a non-flame retardant material, and the manufacturing cost is low.

As shown in FIG. 14C, the bottom of the water storage element 9 also includes a water outlet hole 91 and a water blocking member 92. The bottom of the water storage element 9 is arranged to be inclined toward the water outlet hole 91, so that the excess water in the water storage element 9 may be discharged from the water outlet hole 91 along the bottom of the water storage element 9. The water blocking member 92 is arranged near the water outlet hole 91 and extends from the bottom of the water storage element 9. The bottom of the water blocking member 92 is lower than the bottom of the water outlet hole 91, so that the water blocking member 92 can prevent the water flowing out of the water outlet hole 91 from splashing around.

Figure 15A:
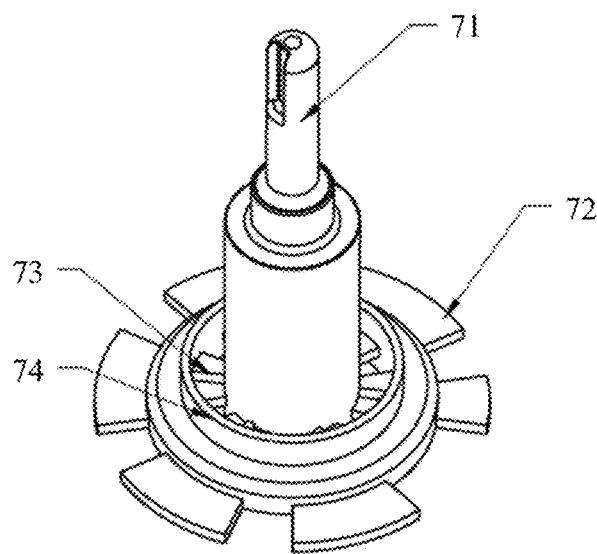
FIG. 15A shows a perspective view of a water diversion drive shaft according to an exemplary embodiment of the present disclosure.
Figure 15B:
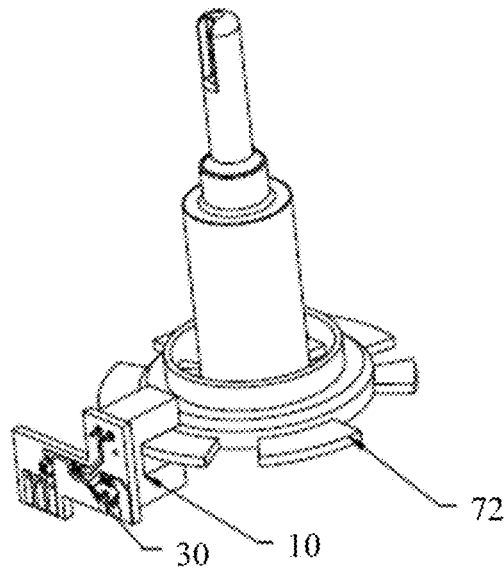
FIG. 15B shows a perspective view of a water diversion drive shaft, a photoelectric switch and a PCB according to an exemplary embodiment of the present disclosure.

FIG. 15A shows a perspective view of a water diversion drive shaft according to an exemplary embodiment of the present disclosure. FIG. 15B shows a perspective view of a water diversion drive shaft 7, a photoelectric switch 10 and a PCB 30 according to an exemplary embodiment of the present disclosure.

As shown in FIG. 15A, the water diversion drive shaft 7 includes a rotating shaft 71, baffles 72, a water passage 73 and a water retaining rib 74. The baffles 72 are arranged at intervals along the circumferential direction of the water diversion drive shaft 7, and the widths of the plurality of baffles 72 are different from each other. The water passage 73 is provided in the circumferential direction of the bottom of the rotating shaft 71 to allow the leaking water flow through. The water retaining rib 74 extends along the axial direction to form an isolation structure to prevent the leaking water from entering the baffles 72.

When water leakage occurs in the waterway, the water passes through the water passage 73 at the bottom of the rotating shaft 71, passes through the lower end cover 82 and enters the water storage element 9 to flow out from the water outlet hole 91 of the water storage element 9.

As shown in FIG. 15B, a photoelectric switch 10 and a PCB 30 may also be provided on the lower end cover 82. The photoelectric switch 10 is electrically connected to the PCB 30, and the PCB 30 receives and processes the signal sent by the photoelectric switch 10. The motor 100 is energized to drive the rotating shaft 71 to rotate. When the rotating shaft 71 rotates, the baffles 72 respectively pass through the sensing area of the photoelectric switch 10, and the photoelectric switch 10 outputs high and low electric frequency signals. Due to the difference in the widths or gaps of the baffles 72, the high and low electric frequency signal feedback of the photoelectric switch 10 will produce a wavelength difference. According to the wavelength difference, the angular position of the rotating shaft 71 may be fed back to control the switch of the motor 100 to ensure that the rotating shaft 71 changes the water flow direction of the water diversion valve in the dishwasher in time.

Figure 16:
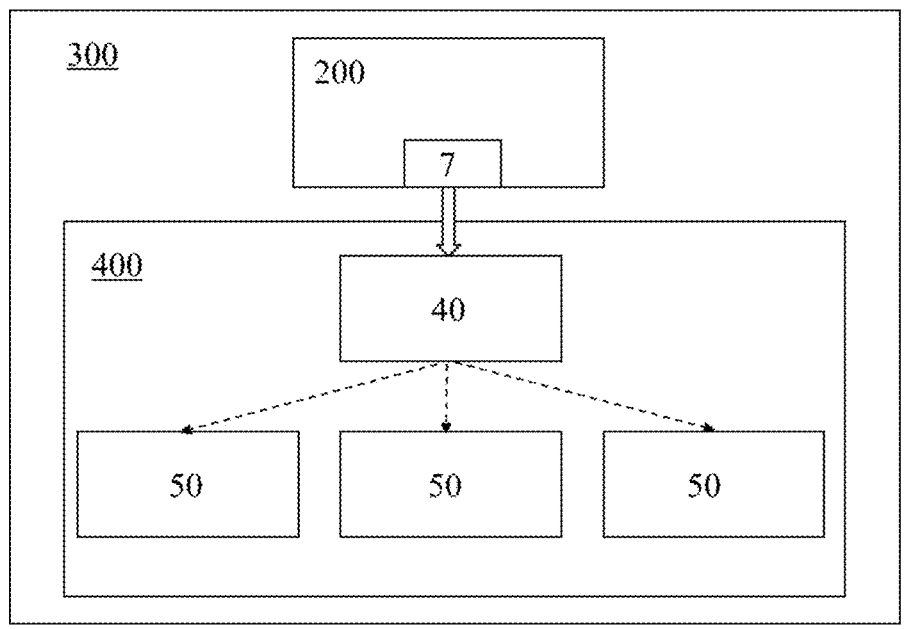
FIG. 16 shows a schematic diagram of the connection relationship of a dishwasher according to an exemplary embodiment of the present disclosure.

FIG. 16 shows a schematic diagram of the connection relationship of a dishwasher according to an exemplary embodiment of the present disclosure. As shown in FIG. 16, at least one embodiment of the present disclosure further provides a dishwasher 300, including: a water diversion valve 400 provided with a switching element 40 and a plurality of water flow channels 50; and the aforementioned water diversion device 200. The water diversion drive shaft 7 of the water divider 200 is connected to the water diversion valve 400 to drive the switching element 40 to switch the water flow direction between the plurality of water flow channels 50.

What are described above is only specific implementations of the present invention, but the scope of protection of the embodiments of the present invention is not limited thereto. Any person skilled in the art can easily envisage changes or substitutions within the technical scope disclosed in the embodiments of the present invention or under the inventive ideas disclosed in the embodiments of the present invention, and all these should be included within the protection scope of the embodiments of the present invention.

What is claimed is:

1. A motor, comprising:
a housing accommodating a coil assembly;
a lead portion electrically connected to the coil assembly and configured to be electrically connected to an external connector;
a terminal connecting device connected to the housing and configured to receive the lead portion and the external connector and electrically connect the lead portion with the external connector; and
an isolation component fixed to the terminal connecting device and enclosing a live part of the lead portion together with the terminal connecting device,
wherein the terminal connecting device and the isolation component are both made from a flame-resistant material,
wherein the lead portion comprises:
a pin electrically connected to the coil assembly of the motor;
a support component supporting and accommodating the pin and fixedly holding the pin on the coil assembly; and
one or more terminals made from conductive materials, wherein each terminal comprises a first terminal portion and a second terminal portion, the first terminal portion is directly electrically connected to the pin, the second terminal portion is configured to be directly electrically connected to the external connector, and the terminal is mounted in the terminal connecting device, wherein the first terminal portion and the second terminal portion are integrally formed,
wherein the live part of the lead portion is the pin and the one or more terminals.

2. The motor of claim 1, wherein the terminal connecting device comprises:

a main body comprising three main body side walls arranged in a generally U shape, the three main body side walls defining a cavity; and a receptacle integrally formed with the main body, wherein the receptacle is configured to accommodate the external connector.

3. The motor of claim 2, wherein the housing comprises a notch on a side wall of the housing, the notch communicates with an opening of the housing, and the terminal connecting device is fixedly mounted on the radial outer side of the housing and covers the notch.

4. The motor of claim 2, wherein
the terminal is mounted in the cavity of the main body.

5. The motor of claim 4, wherein two main body side walls opposite to each other of the three main body side walls comprise snaps extending from edges thereof, wherein the snaps are configured to be snap-connected to the support component.

6. The motor of claim 4, wherein
the first terminal portion comprises a first body and an elastic contact, wherein the first body defines a first insertion direction for inserting the pin, the elastic contact extends from the first body, and the elastic contact is configured to be elastically deformed with the insertion of the pin to apply contact force on the pin,
the second terminal portion comprises a second body, wherein the second body defines a second insertion direction for inserting into the external connector, and wherein
each terminal further comprises a bending portion, and the first terminal portion and the second terminal portion are connected via the bending portion, such that the first insertion direction is substantially perpendicular to the second insertion direction.

7. The motor of claim 6, wherein the first terminal portion further comprises:
a pair of side wings formed by bending from a side of the first body, wherein the elastic contact is formed by bending two surfaces of the pair of side wings toward each other, thereby a pair of contact protrusions is formed, so that when the pin is inserted, an elastic connection is formed between the pin and the pair of contact protrusions.

8. The motor of claim 6, wherein the main body is provided with a plurality of mounting holes for accommodating the second terminal portion and a plurality of mounting slots for accommodating the first terminal portion, and the mounting holes are arranged adjacent to the corresponding mounting slots to form mounting pairs, wherein each of the mounting pairs is mounted with one of the terminals, and a mounting gap between each of the plurality of mounting slots and the first body is between 0 and 0.5 mm.

9. The motor of claim 8, wherein a depth of each of the plurality of mounting slots is greater than or equal to a height of the first body of the first terminal portion, and each of the plurality of mounting slots comprises a limit boss that protrudes from at least one side wall of the mounting slots and engages the first terminal portion to limit the vibration of the terminals.

10. The motor of claim 8, wherein insulating ribs are provided between the adjacent mounting pairs.

11. The motor of claim 8, wherein a cross-sectional shape of the second terminal portion is rectangular or U-shaped, which comprises at least two second side walls extending along the second insertion direction, the at least two second side walls are configured to be electrically connected to an electrical contact portion of the external connector when the external connector is inserted, wherein the second terminal portion further comprises a snap-fitting elastic member, and the snap-fitting elastic member comprises a free portion extending in a direction away from the second body and extending obliquely with respect to the second body on the at least two second side walls.

12. The motor of claim 11, wherein each of the plurality of mounting holes comprises:
a guiding positioning rib arranged within the mounting hole, with a width slightly smaller than a width between the inner surfaces of at least two second side walls of the second terminal portion to allow the guiding positioning rib to be received between inner surfaces of the at least two second side walls of the second terminal portion;
an anti-detachment boss protruding from the inner surface of the mounting hole, wherein the anti-detachment boss is configured to form a snap connection with the snap-fitting elastic member when the second terminal portion is mounted.

13. The motor of claim 6, wherein the elastic contact comprises an elastic arm and a contact protrusion, the elastic arm is bent with respect to the first insertion direction to form a first angle, the first angle ranges from 15 degrees to 50 degrees, wherein the elastic arm is configured to be bent and deformed in a direction that reduces the first angle with the insertion of the pin to generate the contact force, and the contact protrusion is configured to contact the pin to apply the contact force.

14. The motor of claim 13, wherein the first terminal portion further comprises:
at least one limiting portion formed by bending from a side of the first body, wherein the at least one limiting portion comprises a side wall and a top wall, and the at least one limiting portion is enclosed together with the first body to form a pin cavity for receiving the pin.

15. The motor of claim 14, wherein the first body comprises a bottom wall, and the elastic contact extends from the bottom wall along the first insert direction, so that an elastic connection is formed between the pin, the top wall and the contact protrusion when the pin is inserted into the pin cavity.

16. The motor of claim 15, wherein the elastic contact further comprises a support arm that extends from the contact protrusion and forms a second angle with the elastic arm, so that the elastic arm and the support arm form a substantially V-shape.

17. The motor of claim 16, wherein the second angle ranges from 90 degrees to 130 degrees, so that an end of the support arm is slidable on the bottom wall along the first insertion direction when the pin is inserted into the pin cavity,
a height a of the support arm in a direction perpendicular to the first insertion direction, a height b of the pin cavity in a direction perpendicular to the first insertion direction, and a maximum dimension c of a cross section of the pin satisfy the following relationship: $b-a<c$ and $a<b$.

* * * * *